Patented Oct. 31, 1939

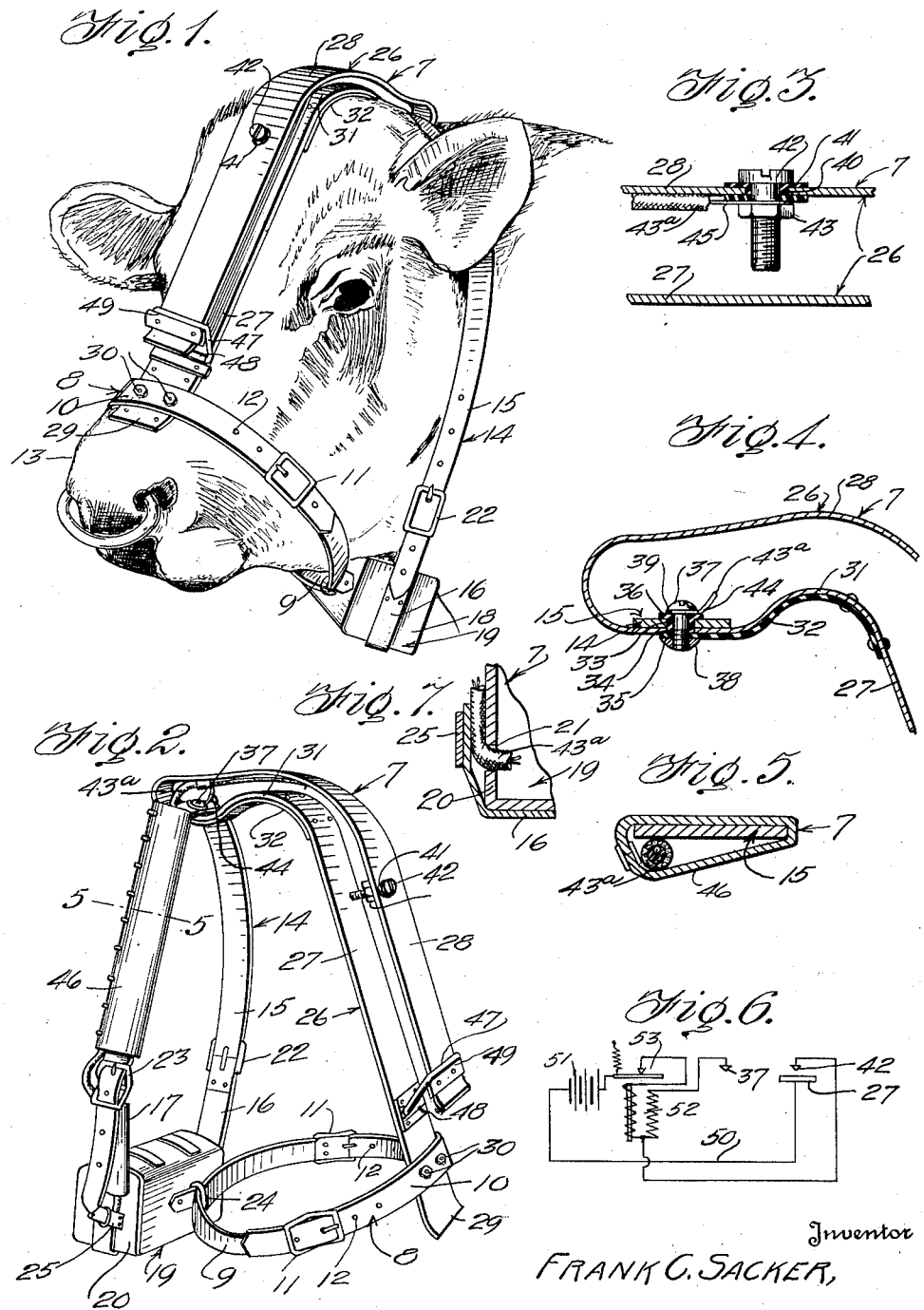

2,177,789

UNITED STATES PATENT OFFICE 2,177,789

ANTIBUTTING DEVICE FOR FARM ANIMALS

Frank C. Sacker, Monroe, Wis., assignor to Adam Marty, Monroe, Wis.

Application June 16, 1938, Serial No. 214,127

8 Claims. (Cl. 175—265)

This invention relates to an antibutting device for farm animals, more particularly bulls.

The invention aims to provide, in a manner as hereinafter set forth, a device of the class referred to for imparting a disagreeable, but harmless electrical shock to an animal to cause the animal to be discouraged from butting, such shock being imparted to the animal when the latter is in the act of butting an object, for example, another animal.

The invention further aims to provide a device for the purpose referred to which constitutes an electric halter for the use on bulls.

The invention further aims to provide a device for the purpose referred to which may be readily applied to or removed from an animal, and which will not interfere with use of any other customary appliances used with the animal.

The invention further aims to provide a device for the purpose referred to which will not easily become deranged from desired position on the animal or uncomfortable for the animal to wear.

The invention further aims to provide a device for the purpose referred to which is complete in itself for its intended purpose and which may be readily repaired without need of costly or special tools.

The invention further aims to provide a device for the purpose referred to which is simple in its construction and arrangement, strong, durable, light in weight, compact, thoroughly efficient for the purpose intended thereby, quickly installed on and removed from the animal when occasion requires, readily assembled and comparatively inexpensive to manufacture.

Embodying the aims as aforesaid, and to others which may hereinafter appear directly or indirectly, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a perspective view simulating the head of a bull and showing the adaptation therewith of an antibutting device, in accordance with this invention looking towards one side of the device, Figure 2 is a perspective view of the device looking towards the opposite side thereof, Figure 3 is a detail in lengthwise section.

Figure 4 is a fragmentary view in longitudinal section of the resilient holder,

Figure 5 is a section on line 5—5 Figure 2,

Figure 6 is a diagram of the circuit, and

Figure 7 is a detail section of the battery case.

The device generally indicated at 7 is substantially of halter-like form and includes an adjustable coupling strap 8 formed of a pair of sections 9, 10. Section 9 is provided at each end with a buckle 11. Section 10 is formed adjacent each end with a set of spaced openings 12 for coaction with the buckles to connect the said sections together. The strap 8 is adapted to encompass the head 13 of the animal above the nostrils.

The device 7 includes a battery suspension 14 of strap-like form and consisting of an upper section 15, a lower section 16 and an intermediate section 17. The section 15 is of greater length than the other sections and has a top part disposing over the head of the animal and side portions depending from such part and arranged at the sides of the head of the animal. The section 15 is to be arranged between the ears and sides of the animal's head as shown. The section 16, at one end terminal portion depends from one of the side portions of section 15 and is secured to the side 18 of a battery case 19. The section 16 passes under the bottom of case 19 and has its other end terminal portion extending upwardly against and is secured to the other side 20 of case 19 at a point below and in proximity to an opening 21 formed in the said side 20. The section 17 depends from the other side portion of section 15 to a point in proximity to opening 21. The section 17 is in the form of a sleeve for a purpose to be referred to. The sections 16, 17 are provided with buckles 22, 23 respectively which coact with the aperture end terminal parts of the side portions of the section 15 for adjustably connecting the latter to sections 16, 17. The battery case 19 preferably will be constructed from leather, as well as the suspension 14. The case 19 is provided with a loop 24 through which passes the section 9 of the coupling strap 8 to prevent the outward swinging of case 19 relative to the animal's head when the device is in position. The opening 21 in the case 19 is to be concealed by a pair of oppositely disposed interengaging short straps 25 which extend across such opening 21. The straps 25 also provide another purpose to be referred to.

The device includes a resilient holder 26 formed from a strap of spring metal bent upon itself to form upstanding superposed spaced inner and outer arms 27, 28 respectively substantially of inverted L-shape in contour connected together, in spaced relation at their upper end by the curved bend 29. The arms 27, 28 are termed respectively a stationary and a shiftable resilient carrier. Each carrier is formed of a top portion and a front portion. The front portion of the carrier 27 is of greater length than the length of and depends below the lower end of the carrier 28. The lower end of carrier 27 is outturned, as at 29. The carrier 27 extends forwardly from the back of the top and down the front of the head of the animal to a point in proximity to its nostrils. The carrier 27 extends under the section 10 of the coupling strap 8 and is secured to the latter by the holdfast means 30. The top portion 31 of the carrier 27 is of compound curvature. Extending transversely of, as well as being secured to said top portion 31 is the intermediate portion of the section 15 of the suspension 14. The side portions of the section 15 depend with respect to the edges of said portion 31. The latter has secured to its lower face a strip of insulation, as indicated at 32. The section 15 of suspension 14, the top portion 31 of carrier 27 and the strip of insulation 32 have aligned openings 33, 34, 35 respectively (Figure 4). The opening 35 is of less diameter than the opening 33, 34. The latter are of like diameter. Mounted in the openings 33, 34 and seated on the strips 32 is a flanged insulating bushing 36 having its flange seated on the section 15 of suspension 14. Extending through the bushing and strip 32 is a headed binding post 37 carrying a clamping nut 38 on the post 37 and the bushing 36 is a metallic washer 39.

The carrier 28 in proximity to its top portion is formed with an opening 40 which has extending therethrough a double flanged non-conducting bushing or grommet 41 fixed to such carrier. Extending through the bushing 41 is a headed, threaded combined binding post and circuit closer element 42 carrying a clamping nut 43 below the bushing 41. The element 42 is normally spaced from the carrier 27 and is adapted to impact the latter when carrier 28 is shifted inwardly on the act of the animal butting. The carrier 27 constitutes a contact for coacting with element 42 to close the shocking circuit.

Leading from the battery, within the case 19 are circuit connections 43ª which are attached, as at 44 to binding post 37 and, as at 45 to the element 42. The connections 43 extend outwardly from case 19 through the opening 21 and are retained against the case 19 by the straps 25. The connections 43 pass upwardly through the section 17 of the suspension 14 and then up through a confining sleeve 46 of leather which is mounted on one of the side portions of the section 15 of suspension 14. The connections 43 after passing from the upper end of the sleeve 46 extend between the carriers 27, 28 and is electrically connected to the binding posts.

Due to the resiliency of the carrier 28, it normally tends to project away from the carrier 27, and to limit such movement of carrier 28 a loop-like latch 47 is provided. The latch 47 is pivoted, as at 48 to near the lower end of the carrier 27 and coacts with a keeper 49 on the lower end of carrier 28 to maintain the latter in the position shown in Figures 1 and 2. Such position of carrier 28 being in paralleled spaced relation to carrier 27.

The shock circuit is shown by Figure 6 and is generally indicated at 50.

When the animal is in the act of butting, the carrier 28 will be shifted toward the carrier 27, whereby element 42 will contact wire carrier 27 thereby closing the circuit and an electrical shock will be imparted to the animal at its forehead.

The strap 8 constitutes a loop for encompassing the animal's head. The suspension 14 in connection with the case 19 provides a loop for encompassing the neck of the animal.

The battery case contains the battery 51 together with the shock coil 52 and its interrupter 53.

What I claim is:

1. An antibutting device for animals comprising a skeleton structure substantially of halter like form, said structure including a loop for encompassing the head of the animal, coacting parts providing a loop for encompassing the neck of the animal, one of said coacting parts being in the form of a case containing a battery, and a normally open shocking circuit forming means connected to said loops and battery and including a stationary inner part of conducting material positioned against the head of the animal and a resilient depressible outer part of conducting material normally disposed in spaced relation to and brought into contacting relation with respect to said inner part to close the circuit to shock the animal by and when the animal is in the act of butting.

2. An antibutting device for animals comprising a skeleton structure substantially of halter like form, said structure including a loop for encompassing the head of the animal, coacting parts providing a loop for encompassing the neck of the animal, one of said coacting parts being in the form of a case containing a battery, and a normally open shocking circuit forming means connected to said loops and battery and including a stationary inner part of conducting material positioned against the head of the animal and a resilient depressible outer part of conducting material normally disposed in spaced relation to and brought into contacting relation with respect to said inner part to close the circuit to shock the animal by and when the animal is in the act of butting, each of said parts being of substantially inverted L-shape contour and including a horizontally disposed upper portion and a portion depending from the outer end of the upper portion, the said inner part for seating on the head of the animal and having the lower face of its upper portion provided with a strip of insulation.

3. In an antibutting device for animals, a skeleton structure substantially of halter-like form for mounting on and having means for connecting it to the neck and head of the animal, said structure including means for providing a normally open electrical shocking circuit, a circuit closer and a resilient normally extended depressible part carrying said closer and actuated in a direction by the animal when in the act of butting to shift said closer to circuit closing position to provide for imparting an electrical shock to the animal.

4. In an antibutting device for animals, a resilient holder of conducting material formed of an inner stationary carrier and an outer resilient depressible carrier opposing and disposed in superposed spaced relation to said inner carrier, means for connecting said inner carrier of the holder onto the head of the animal and having as a part thereof a normally open electrical shocking circuit forming means connected to said carriers including an electrical source, and said carriers having coacting parts to close the circuit made active on the depressing of the outer carrier by the animal when in the act of butting thereby imparting an electrical shock to the animal.

5. In an antibutting device for animals, a resilient holder of conducting material formed of an inner stationary carrier and an outer resilient depressible carrier opposing and disposed in superposed spaced relation to said inner carrier, means for connecting said inner carrier of the holder onto the head of the animal and having as a part thereof a normally open electrical shocking circuit forming means connected to said carriers including an electrical source, said carriers having coacting parts to close the circuit made active on the depressing of the outer carrier by the animal when in the act of butting thereby imparting an electrical shock to the animal, said carriers having other coacting parts to constitute a pivotal connection therebetween for limiting the outward movement of the outer carrier with respect to the inner carrier.

6. In an antibutting device for animals, a resilient holder of conducting material formed of an inner stationary carrier and an outer resilient depressible carrier opposing and disposed in superposed spaced relation to said inner carrier, means for connecting said inner carrier of the holder onto the head of the animal and having as a part thereof a normally open electrical shocking circuit forming means connected to said carriers including an electrical source, said carriers having coacting parts to close the circuit made active on the depressing of the outer carrier by the animal when in the act of butting thereby imparting an electrical shock to the animal, the points of connection between said circuit forming means and the carriers being disposed in spaced relation.

7. In an antibutting device for animals, a resilient holder of conducting material formed of an inner stationary carrier and an outer resilient depressible carrier opposing and disposed in superposed spaced relation to said inner carrier, means for connecting said inner carrier of the holder onto the head of the animal and having as a part thereof a normally open electrical shocking circuit forming means connected to said carriers including an electrical source, said carriers having coacting parts to close the circuit made active on the depressing of the outer carrier by the animal when in the act of butting thereby imparting an electrical shock to the animal, said inner carrier having the lower face of a portion thereof provided with a strip of insulation for seating on the forehead of the animal.

8. In an antibutting device for animals, a resilient holder of conducting material formed of an inner stationary carrier and an outer resilient depressible carrier opposing and disposed in superposed spaced relation to said inner carrier, means for connecting said inner carrier of the holder onto the head of the animal and having as a part thereof a normally open electrical shocking circuit forming means connected to said carriers including an electrical source, and said carriers having coacting parts to close the circuit made active on the depressing of the outer carrier by the animal when in the act of butting thereby imparting an electrical shock to the animal, each of said carriers being substantially of L-shaped contour for disposing over the top and at the front of the head of the animal, the inner carrier being of greater length than and depending below the lower end of the outer carrier, and said inner carrier having its inner face provided with a strip of insulation for seating on the forehead of the animal.

FRANK C. SACKER.